United States Patent
Zhao et al.

(10) Patent No.: US 8,833,149 B2
(45) Date of Patent: Sep. 16, 2014

(54) PISTON FUEL-INJECTOR DETECTION DEVICE

(75) Inventors: Xun Zhao, Dalian (CN); Yuejin Huang, Dalian (CN)

(73) Assignee: Dalian Dexin M & E Technology Engineering Co., Ltd., Dalian, Liaoning (CN)

(*) Notice: Subject to any disclaimer, the term of this patent is extended or adjusted under 35 U.S.C. 154(b) by 0 days.

(21) Appl. No.: 13/880,981

(22) PCT Filed: Dec. 3, 2010

(86) PCT No.: PCT/CN2010/001956
§ 371 (c)(1),
(2), (4) Date: May 8, 2013

(87) PCT Pub. No.: WO2012/055078
PCT Pub. Date: May 3, 2012

(65) Prior Publication Data
US 2013/0283897 A1    Oct. 31, 2013

(30) Foreign Application Priority Data

Oct. 25, 2010   (CN) .......................... 2010 1 0516736

(51) Int. Cl.
*F02M 65/00* (2006.01)
*G01M 15/04* (2006.01)

(52) U.S. Cl.
CPC ............... *F02M 65/00* (2013.01); *G01M 15/04* (2013.01); *F02M 65/005* (2013.01); *F02M 2200/24* (2013.01); *F02M 65/001* (2013.01)
USPC ..................................... 73/114.47; 73/114.45

(58) Field of Classification Search
CPC ............ F02M 2200/24; F02M 65/001; F02M 65/005; G01M 15/04
USPC .......................................... 73/114.45, 114.47
See application file for complete search history.

(56) References Cited

U.S. PATENT DOCUMENTS

| 7,878,050 B2* | 2/2011 | Cueto | 73/114.48 |
| 7,975,535 B2* | 7/2011 | Cueto | 73/114.48 |
| 8,205,491 B2* | 6/2012 | Cueto | 73/114.49 |
| 2012/0073361 A1* | 3/2012 | Cueto | 73/114.45 |

* cited by examiner

*Primary Examiner* — Freddie Kirkland, III
(74) *Attorney, Agent, or Firm* — Novick, Kim & Lee, PLLC; Allen Xue

(57) ABSTRACT

A piston fuel injector detecting device, comprising a base (1), a perspective platform (2), an observation cover (3), a sliding groove (4), an adjusting handle (5), a conducting wire column (6), a supporting plate (7), a tact switch (8), a limit plate (9), an infrared-ray emitting tube (10), an illuminating device (11) and a positioning pin (12), wherein the base (1) is connected with the perspective platform (2) and the positioning pin (12); the perspective platform (2) is connected with the observation cover (3) which is provided with the sliding groove (4); the adjusting handle (5) is connected with the observation cover (3); the conducting wire column (6) is vertically connected with the base (1) and is connected with the supporting plate (7) which is provided with the tact switch (8); the conducting wire column (6) is connected with the limit plate (9) which is connected with the infrared-ray emitting tube (10) and the illuminating device (11). The device can detect a is fuel injector without a trial injection by the fuel injector, and has advantages of no environmental pollution and low cost.

2 Claims, 1 Drawing Sheet

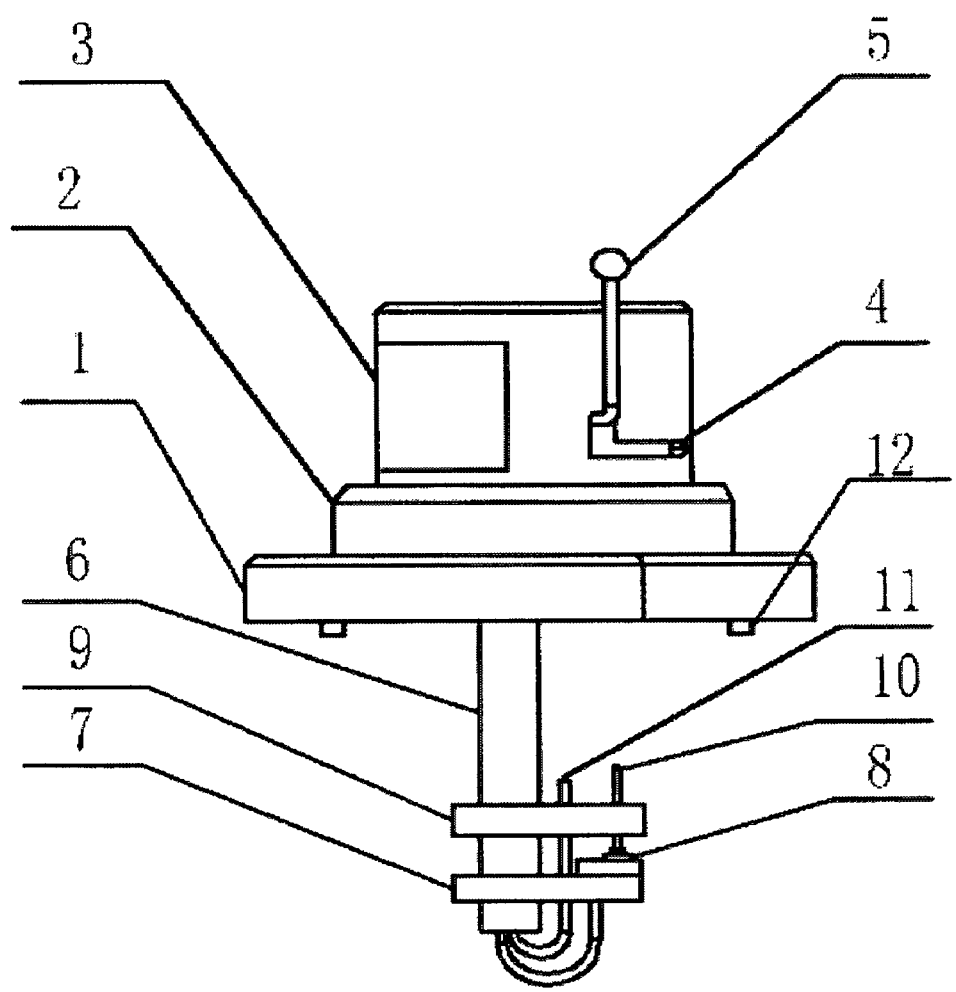

PISTON FUEL-INJECTOR DETECTION DEVICE

TECHNICAL FIELD

The present invention relates to a piston fuel injector detecting field, particularly to a piston fuel injector detecting device.

BACKGROUND

At present, a fuel injection environment simulation method is generally used to detect a piston fuel injector in car plants. In this method, a fuel injection nozzle is mounted on a test bed in a same environment as that of an inner chamber of an engine, and is caused to inject fuel. If the fuel which is injected out reaches a predetermined position, it is considered to be qualified. The disadvantages of the detecting method include wasting time and labor as well as human cost, and polluting the environment in a workshop.

SUMMARY OF THE INVENTION

In view of the disadvantages in the prior art, the purpose of the present invention is to provide a piston fuel injector detecting device that saves time and labor as well as human cost and avoids polluting the environment.

In order to realize the above purpose, the present invention adopts the following technical solution:

A piston fuel injector detecting device, comprising a base, a perspective platform, an observation cover, a sliding groove, an adjusting handle, a conducting wire column, a supporting plate, a tact switch, a limit plate, an infrared-ray emitting tube, an illuminating device and a positioning pin, wherein the base is connected with the perspective platform and the positioning pin; the perspective platform is connected with the observation cover which is provided with the sliding groove; the adjusting handle is connected with the observation cover; the conducting wire column is vertically connected with the base and is connected with the supporting plate which is provided with the tact switch; the conducting wire column is connected with the limit plate which is connected with the infrared-ray emitting tube and the illuminating device.

The adjusting handle is capable of sliding in the sliding groove.

The beneficial effects of the present invention are that a fuel injector detecting is carried out without a trial injection by the fuel injector, time and labor as well as human cost are saved, and the pollution to the environment is avoided.

BRIEF DESCRIPTION OF THE DRAWINGS

FIG. 1 is a brief structural drawing of the present invention.

DETAILED DESCRIPTION OF THE PREFERRED EMBODIMENTS

The reference numbers in FIG. 1 are as follows: base 1, perspective platform 2, observation cover 3, sliding groove 4, adjusting handle 5, conducting wire column 6, supporting plate 7, tact switch 8, limit plate 9, infrared-ray emitting tube 10, illuminating device 11, positioning pin 12.

A piston fuel injector detecting device, as shown in FIG. 1, is mainly structured as follows: the base 1 is connected with the perspective platform 2 and the positioning pin 12; the perspective platform 2 is connected with the observation cover 3 which is provided with the sliding groove 4; the adjusting handle 5 is connected with the observation cover 3; the conducting wire column 6 is vertically connected with the base 1 and is connected with the supporting plate 7 which is provided with the tact switch 8; the conducting wire column 6 is connected with the limit plate 9 which is connected with the infrared-ray emitting tube 10 and the illuminating device 11.

The piston fuel injector detecting device is placed on an assembly plane of a piston and is accurately positioned by the positioning pin 12; at this time, the conducting wire column 6 and the infrared-ray emitting tube 10 therebelow have entered an inner portion of a piston cylinder block; the horizontally-located adjusting handle 5 is lifted so as to slide in the sliding groove 4 and be vertically located; meanwhile, the conducting wire column 6 turns 6-degree with respect to an initial position, and an opening of the infrared-ray emitting tube 10 vertically faces to the fuel injection nozzle which is to be detected. After a start button being pressed, the infrared-ray emitting tube 10 drives the tact switch 8 and starts to emit infrared ray, and the illuminating device 11 provides illumination; when the position of the fuel injection nozzle to be detected is incorrect, the infrared ray is to be emitted to the perspective platform and be observable through the observation cover; when the position of the fuel injection nozzle is correct, the infrared ray is to be emitted into the fuel injection nozzle, and the information is to be fed back to is the computer and displayed on the computer screen.

The invention claimed is:

1. A piston fuel injector detecting device, comprising a base, a perspective platform, an observation cover, a sliding groove, an adjusting handle, a conducting wire column, a supporting plate, a tact switch, a limit plate, an infrared-ray emitting tube, an illuminating device and a positioning pin, wherein the base is connected with the perspective platform and the positioning pin; the perspective platform is connected with the observation cover which is provided with the sliding groove; the adjusting handle is connected with the observation cover; the conducting wire column is vertically connected with the base and is connected with the supporting plate which is provided with the tact switch; the conducting wire column is connected with the limit plate which is connected with the infrared-ray emitting tube and the illuminating device.

2. The piston fuel injector detecting device according to claim 1, wherein the is adjusting handle is capable of sliding in the sliding groove.

* * * * *